United States Patent [19]

Christman

[11] Patent Number: 4,585,807
[45] Date of Patent: Apr. 29, 1986

[54] RIGID POLYURETHANE FOAMS EMPLOYING OXYALKYLATED ETHYLENEDIAMINE

[75] Inventor: Donald L. Christman, Grosse Ile, Mich.

[73] Assignee: BASF Corporation, Wyandotte, Mich.

[21] Appl. No.: 691,511

[22] Filed: Jan. 14, 1985

[51] Int. Cl.⁴ .............................................. C08G 18/14
[52] U.S. Cl. ..................................... 521/167; 521/175
[58] Field of Search ................................ 521/167, 175

[56] References Cited

U.S. PATENT DOCUMENTS

| | | | |
|---|---|---|---|
| 3,091,551 | 5/1963 | Robertson | 521/167 |
| 3,471,416 | 10/1969 | Fijal | 521/167 |
| 3,499,009 | 3/1970 | Odinak et al. | 528/308 |
| 3,686,101 | 8/1972 | Davis et al. | 521/167 |
| 4,209,609 | 6/1980 | Haas | 528/421 |
| 4,374,209 | 2/1983 | Rowlands | 521/164 |

Primary Examiner—Maurice J. Welsh
Attorney, Agent, or Firm—Nobert M. Lisicki

[57] ABSTRACT

The invention relates to rigid polyurethane foams prepared by reacting a polyether polyol other than one derived from ethylenediamine, an alkylene oxide adduct of ethylenediamine, catalyst, surfactant, and blowing agent, and an organic polyisocyanate. The compositions are useful for producing insulation panels.

6 Claims, No Drawings

RIGID POLYURETHANE FOAMS EMPLOYING OXYALKYLATED ETHYLENEDIAMINE

BACKGROUND OF THE INVENTION

1. Field of the Invention

This invention pertains to the preparation of rigid polyurethane foams containing alkylene oxide adducts of ethylenediamine.

2. Description of the Prior Art

U.S. Pat. No. 3,499,009 teaches the oxyalkylation of a polyamine by reacting first with 2 to 20 molar equivalents of ethylene oxide followed by 2 to 20 molar equivalents of a $C_3$–$C_5$ vicinal alkylene oxide. These products are employed for the preparation of rigid polyurethane foams.

U.S. Pat. No. 4,209,609 teaches the oxyalkylation of toluenediamine with 3 to 5 moles of ethylene oxide and second with 1 to 5 moles of a $C_3$–$C_9$ vicinal alkylene oxide. There is no teaching than an oxyalkylated ethylenediamine may be employed in the preparation of rigid polyurethane foams displaying good K-factor properties.

SUMMARY OF THE INVENTION

This invention relates to a rigid polyurethane foam prepared by
(a) mixing a polyoxyalkylene polyether polyol other than one derived from ethylenediamine,
(b) an alkylene oxide adduct of ethylenediamine,
(c) catalyst, surfactant and blowing agent, and
(d) reacting the mixture with an organic polyisocyanate.

The rigid polyurethane foams thus prepared have good K-factor properties and can be used as insulation in those areas which require low K-factors.

DESCRIPTION OF THE PREFERRED EMBODIMENTS

The rigid polyurethane foams which are the subject matter of this invention are prepared by reacting a mixture of
(a) a polyoxyalkylene polyether other than one derived from ethylenediamine,
(b) an ethylene oxide, and/or propylene oxide adduct of ethylenediamine having a molecular weight range from about 200 to about 500,
(c) catalyst, surfactant, and blowing agent, with an organic polyisocyanate.

The ratio of polyether polyol to the adduct of ethylenediamine is from about 2.5:1 to about 1:1.5, preferably 1:1.

The polyoxyalkylene polyether polyol or polyether blend which are employed in the subject invention are well known in the art and are generally referred to as polyoxyalkylene polyether polyols. These polyols are prepared by the reaction of an alkylene oxide with a polyhydric compound. Alkylene oxides which may be employed in the preparation of the polyols of the present invention include ethylene oxide, propylene oxide, the isomeric normal butylene oxides, hexylene oxide, octylene oxide, dodecene oxide, methoxy and other alkoxy propylene oxides, and cyclohexene oxide. Styrene oxide may also be employed. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

The polyoxyalkylene polyether polyols may have either primary or secondary hydroxyl groups and preferably are prepared from alkylene oxides having from 2 to 8 carbon atoms and may have molecular weights from about 400 to about 10,000. The polyoxyalkylene polyether glycol may be prepared by any known process such as, for example, the process disclosed by Wurtz in 1859 and *Encyclopedia of Chemical Technology*, Vol. 7, pages 257–262, published by Interscience Publishers, Inc. (1951) or in U.S. Pat. No. 1,922,459.

Polyhydric compounds which may be reacted with the alkylene oxides to prepare the polyalkylene ether polyols employed in the subject ivention include ethylene glycol, propylene glycol, diethylene glycol, dipropylene glycol, the isomeric butylene glycols, 1,5-pentane diol, 1,6-hexanediol, glycerol, trimethylolpropane, 1,2,6-hexanetriol, pentaerythritol, sorbitol, sucrose and alpha-methyl glycoside.

The alkylene oxide adduct of ethylenediamine is prepared by reacting ethylene oxide and/or propylene oxide with ethylenediamine, possibly in the presence of an alkaline catalyst. This catalyst may be potassium hydroxide, sodium hydroxide, sodium and potassium methylate and other catalyst well known to those skilled in the art. The quantity of ethylene and propylene oxide employed is such that the molecular weight of the adduct may vary from about 200 to about 500. The ethylene oxide content may range from about 0 percent to about 90 percent based on the total weight of the adduct.

The mixture of polyoxyalkylene polyether polyol and ethylenediamine adduct is reacted with an organic polyisocyanate such that the ratio of isocyanate groups of the polyisocyanate to the hydroxyl groups of the polyether polyol is 1.0:1 to 1.3:1. Polyisocyanates which may be used include aromatic, aliphatic, and cycloaliphatic polyisocyanates and combinations thereof. Representative examples are diisocyanates such a m-phenylene diisocyanate, 2,4-toluenediisocyanate, 2,6-toluenediisocyanate, mixtures of 2,4-toluenediisocyanate and 2,6-toluenediisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; the triisocyanates such as 4,4'4"-triphenylmethane triisocyanate polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate, which is most preferred, is a product which results from the phosgenation of an aniline-formaldehyde condensation product; it is sometimes called "crude MDI."

As was previously mentioned, catalysts may be used to increase the reaction rate. If catalysts are used, they are added to the mixture of the polyether polyol and ethylenediamine adduct blend before the reaction of the mixture with the polyisocyanate.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. Generally, the amount of urethane-promoting catalyst employed will be from 0.01 percent to 10 percent by weight based on the weight of the polyether polyol.

The polyurethane foams employed in the present invention are generally prepared by the reaction of the polyol mixture with an organic polyisocyanate in the presence of a blowing agent and optionally in the presence of additional polyhydroxyl-containing components, chain-extending agents; catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and-/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichloromethane, dichlorodifluoroethane, vinylidene chloride, and methylene chloride may be used as blowing agents.

A surface-active agent is generally necessary for production of high grade polyurethane foam according to the present invention, since in the absence of same, the foams collapse or contain very large uneven cells. Numerous surface-active agents have been found satisfactory. Nonionic surface-active and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkanolamine salts of long chain alkylacid sulfate esters, alkyl sulfonic esters, and alkyl arysulfonic acids.

The following examples illustrate the nature of the invention. All parts are by weight unless otherwise stated. The K-factors were determined employing ASTM method C-518.

Polyol A is a propylene oxide adduct of a mixture of sucrose and propylene glycol, having a hydroxyl number of about 563.

Polyol B is propylene oxide ethylene oxide adduct of ethylenediamine having a hydroxyl number of about 450 and containing 8.8 percent ethylene oxide.

Polyol C is a propylene oxide adduct of ethylenediamine having a hydroxyl number of about 489.

Polyol D is a propylene oxide ethylene oxide adduct of ethylenediamine having a hydroxyl number of about 488 and containing 28.2 percent ethylene oxide.

Polyol E is a propylene oxide ethylene oxide adduct of ethylenediamine having a hydroxyl number of about 489 and containing 31.4 percent ethylene oxide.

Polyol F is a propylene oxide ethylene oxide adduct of ethylenediamine having a hydroxyl number of about 504 and containing 19.8 percent ethylene oxide.

Polyol G is a propylene oxide ethylene oxide adduct of toluenediamine, 90 percent vicinal isomers having a hydroxyl number of 443 and containing 65.7 percent ethylene oxide.

Polyol H is a propylene oxide ethylene oxide adduct of ethylenediamine having a hydroxyl number of about 492 and containing 9.4 percent ethylene oxide.

Polyol I is a propylene oxide ethylene oxide adduct of ethylenediamine having a hydroxyl number of about 494 and containing 18.8 percent ethylene oxide.

Polyol J is a propylene oxide ethylene oxide adduct of ethylenediamine having a hydroxyl number of about 486 and containing 37.6 percent ethylene oxide.

Polyol K is a propylene oxide ethylene oxide adduct of ethylenediamine having a hydroxyl number of about 498 and containing 40.1 percent ethylene oxide.

Polyol L is a propylene oxide ethylene oxide adduct of ethylenediamine having a hydroxyl number of about 495 and containing 34.9 percent ethylene oxide.

Polyol M is a propylene oxide ethylene oxide adduct of ethylenediamine having a hydroxyl number of about 489 and containing 60.9 percent ethylene oxide.

Polyol N is a propylene oxide adduct of a mixture of sucrose and propylene glycol having a hydroxyl number of 507.

DC-193 is a silicone surfactant sold by Dow Corning Corporation.

Polycat 8 is an amine catalyst sold by Abbott Laboratories, Inc.

F-11-A is trichloromonofluoromethane.

Isocyanate A is polyphenylene polymethylene polyisocyanate.

EXAMPLES 1-14

The polyols in the amounts as tabulated in Table I were prepared by charging a container with a suitable quantity of the reactants with the exception of the isocyanate as tabulated. The mixture was stirred for about 30 seconds and allowed to set until the air bubbles had dissipated. The calculated amount of polyisocyanate was added to the container, and the resulting mixture was stirred for about 35 seconds, and the foam was allowed to rise therein. After the foam rise was completed, the resulting foam was cured for about 48 hours at room temperature. The K-factors were then determined.

TABLE I

| Formulation, pbw | Example | | | | | | | | | | | | | |
|---|---|---|---|---|---|---|---|---|---|---|---|---|---|---|
| Polyol | 1 | 2 | 3 | 4 | 5 | 6 | 7 | 8 | 9 | 10 | 11 | 12 | 13 | 14 |
| A | 40 | 40 | 40 | 40 | 40 | — | — | — | — | — | — | — | — | — |
| B | 60 | — | — | — | — | — | — | — | — | — | — | — | — | — |
| C | — | 60 | — | — | — | — | — | — | — | — | — | — | — | — |
| D | — | — | 60 | — | — | — | — | 30 | — | — | — | — | — | — |
| E | — | — | — | 60 | — | — | — | — | 30 | — | — | — | — | — |
| F | — | — | — | — | 60 | — | — | — | — | — | 30 | — | — | — |
| G | — | — | — | — | — | 10 | 10 | 10 | 10 | 10 | 10 | 10 | 10 | 10 |
| H | — | — | — | — | — | 30 | — | — | — | — | — | — | — | — |
| I | — | — | — | — | — | — | 30 | — | — | — | — | — | — | — |
| J | — | — | — | — | — | — | — | — | — | 30 | — | — | — | — |
| K | — | — | — | — | — | — | — | — | — | — | — | 30 | — | — |
| L | — | — | — | — | — | — | — | — | — | — | — | — | 30 | — |
| M | — | — | — | — | — | — | — | — | — | — | — | — | — | 30 |
| N | — | — | — | — | — | 60 | 60 | 60 | 60 | 60 | 60 | 60 | 60 | 60 |
| DC-193 | 1.5 | | | | | | | | | | 1.5 | | | |
| Polycat 8 | 1.0 | | | | | | | | | | 1.0 | | | |
| F-11-A | 38.6 | 39.7 | 39.7 | 39.7 | 40.1 | 38.8 | 38.8 | 38.7 | 38.7 | 38.7 | 38.9 | 38.9 | 38.8 | 38.7 |
| Isocyanate A | 125.1 | 131.6 | 131.5 | 131.6 | 133.9 | 126.1 | 126.3 | 125.8 | 125.9 | 125.7 | 128.0 | 126.6 | 126.4 | 125.9 |
| K-factor | .145 | .141 | .145 | .146 | .144 | .144 | .143 | .143 | .143 | .143 | .142 | .146 | .146 | .146 |

The embodiments of the invention in which an exclusive privilege or property is claimed are defined as follows:

1. A rigid polyurethane foam comprising the reaction product of
   (a) a polyoxyalkylene polyether polyol consisting of a propylene oxide adduct of sucrose and propylene glycol,
   (b) an ethylene oxide and/or propylene oxide adduct of ethylenediamine having a molecular weight range from about 200 to about 500,
   (c) catalyst, surfactant and blowing agent, and
   (d) polymethylene polyphenylene polyisocyanate.

2. The composition of claim 1 wherein the ratio of polyol to the adduct of ethylenediamine is from about 2.5:1 to 1:1.5.

3. The composition of claim 1 wherein the ratio of polyol to the adduct of ethylenediamine is from 2.5:1 to 1:1.

4. A process for preparing a polyurethane composition comprising reacting
   (a) a polyoxyalkylene polyether polyol consisting of a propylene oxide adduct of sucrose and propylene glycol,
   (b) an ethylene oxide and/or propylene oxide adduct of ethylenediamine having a molecular weight range from about 200 to about 500,
   (c) catalyst, surfactant and blowing agent, and
   (d) polymethylene polyphenylene polyisocyanate.

5. The process of claim 4 wherein the ratio of polyol to the adduct of ethylenediamine is from about 2.5:1 to 1:1.5.

6. The process of claim 4 wherein the ratio of polyol to the adduct of ethylenediamine is from 2.5:1 to 1:1.

* * * * *